United States Patent [19]

Imura et al.

[11] Patent Number: 4,941,329
[45] Date of Patent: Jul. 17, 1990

[54] DOUBLE EFFECT AIR-COOLED ABSORPTION REFRIGERATING MACHINE

[75] Inventors: Kouji Imura, Shimoinayoshi; Tomihisa Ohuchi, Tsukuba; Kyoji Kohno; Tamio Shimizu, both of Shimoinayoshi; Michihiko Aizawa, Ushiku, all of Japan

[73] Assignee: Hitachi, Ltd., Tokyo, Japan

[21] Appl. No.: 316,941

[22] Filed: Feb. 28, 1989

[30] Foreign Application Priority Data

Mar. 4, 1988 [JP] Japan .................. 63-49522

[51] Int. Cl.⁵ .......................................... F25B 15/00
[52] U.S. Cl. ........................................................ 62/476
[58] Field of Search ................................. 62/476, 475

[56] References Cited

U.S. PATENT DOCUMENTS

| | | | |
|---|---|---|---|
| 3,491,545 | 1/1970 | Leonard, Jr. ............. | 62/476 X |
| 3,828,575 | 8/1974 | Malcosky et al. ............ | 62/476 |
| 4,291,545 | 9/1981 | Worsham, III ............... | 62/476 X |
| 4,748,830 | 6/1988 | Oouchi et al. ............... | 62/476 |
| 4,791,790 | 12/1988 | Tongu ........................... | 62/476 |

Primary Examiner—Lloyd L. King
Attorney, Agent, or Firm—Antonelli, Terry, Stout & Kraus

[57] ABSTRACT

Fans are disposed on an upper wall face out of the upper wall face, a lower wall face and side wall faces which constitute an outside frame of a machine body. An air-cooled absorber is disposed on two adjacent wall faces. An air-cooled condenser is disposed on one wall face of the remaining side wall faces. A main apparatus comprising such as an evaporator, a high-temperature regenerator, a low-temperature regenerator, a solution heat exchanger and pipes for connecting operatively the apparatuses together is disposed on an inner portion of the machine body so as to be surrounded by the air-cooled absorber and the air-cooled condenser. Thus, a noise generated from the refrigerating machine is reduced.

9 Claims, 3 Drawing Sheets

4,941,329

DOUBLE EFFECT AIR-COOLED ABSORPTION REFRIGERATING MACHINE

BACKGROUND OF THE INVENTION

The present invention relates to a double effect air-cooled absorption refrigerating machine and, more particularly, to a double effect air-cooled absorption refrigerating machine having a small installation area and a compact machine body.

A double effect air-cooled absorption refrigerating machine using water as a coolant and lithium-bromide liquid as an absorbent has been developed and disclosed in, for example, U.S. Pat. No. 4,748,830, in which an air-cooled absorber and an air-cooled condenser are cooled through an air current generated by fans.

In such a conventional double effect air-cooled absorption refrigerating machine, the fans are installed to one wall face of side walls which form an outside frame of a machine body and a structure thereof is made by considering a rainfall and a snowfall factors. However there is no consideration about noise generated from the refrigerating machine.

SUMMARY OF THE INVENTION

An object of the present invention is to provide a double effect air-cooled absorption refrigerating machine having low noise.

In accordance with the present invention, a double effect air-cooled absorption refrigerating machine comprises an evaporator, an air-cooled absorber, an air-cooled condenser, a high-temperature regenerator, a low-temperature regenerator, a solution heat exchanger, piping for connecting operatively these components and fans for supplying a cooling air to the air-cooled absorber and the air-cooled condenser.

The fans are disposed on an upper wall face which, a lower wall face and side wall faces constitute an outside frame of a machine body. The air-cooled absorber is disposed on two adjacent side wall faces, and the air-cooled condenser is disposed on one side wall face of the remaining side wall faces. The refrigeration machine is further comprised of evaporator, the high-temperature regenerator, the low-temperature regenerator, the solution heat exchanger and the pipings for connecting operatively these components, all of which are disposed respectively on an inner portion of the machine body so as to be surrounded by the air-cooled absorber and the air-cooled condenser.

Further, the air-cooled absorber is disposed at two adjacent wall faces of the side wall faces of the machine body, the air-cooled condenser is disposed at one wall face of remaining side wall faces, the fans are disposed at the upper wall face, and the evaporator, the high-temperature regenerator, the low-temperature regenerator, the solution heat exchanger, a solution pump and a refrigerant pump etc. are disposed at a central portion of a space so as to divide at two sections on a fan installation face. As a result a wide heat transfer area and a predetermined fan installation area can be obtained with a minimum installation area, and further a low noise refrigerating machine can be obtained.

The refrigerant generated from the evaporator is sprayed by the refrigerant pump on the tube groups in which a cooling water flows and takes an evaporation heat from the cooling water. The refrigerant becomes a refrigerant vapor having a low pressure and the after flows into the air-cooled absorber.

The air-cooled absorber is cooled directly by an outside air through the fans, and the refrigerant vapor is absorbed by a lithium bromide dense liquid which flows into vertical heat transfer tubes and becomes a weak solution.

The weak solution is sent by the solution pump and introduced into the high-temperature regenerator and also the low-temperature regenerator through the solution heat exchanger. A heat source is supplied to the high-temperature regenerator and the weak solution is condensed and then a vapor is generated.

When the generated vapor passes into the tubes of the low-temperature regenerator, it heats and condenses the weak solution outside of the tubes and is liquefied to condensate itself. Then it becomes a liquid refrigerant and reaches the air-cooled condenser.

A vapor generated from the weak solution of the low-temperature regenerator and the liquid refrigerant, which is condensed in the low-temperature regenerator, both flows into the air-cooled condenser and is cooled by the outside air therein through the fans and becomes a liquid refrigerant and after returns into the evaporator.

The solution, which is condensed respectively in the high-temperature regenerator and the low-temperature regenerator, is sent into the air-cooled absorber through the solution heat exchanger and such an absorption process is carried out repeatedly again.

Since a plurality of fans are disposed on the upper wall face of the machine body, the air-cooled absorber is disposed at two adjacent wall faces of the machine body, and the air-cooled condenser is disposed on at one wall face of remaining wall faces, a sufficient heat transfer area is secured with a minimum installation area, and the outside air can pass through smoothly Further since it is possible to enter into the inner portion from the one remaining wall face, a maintenance of the refrigerating machine can be done easily.

DESCRIPTION OF THE INVENTION

Figure 1:
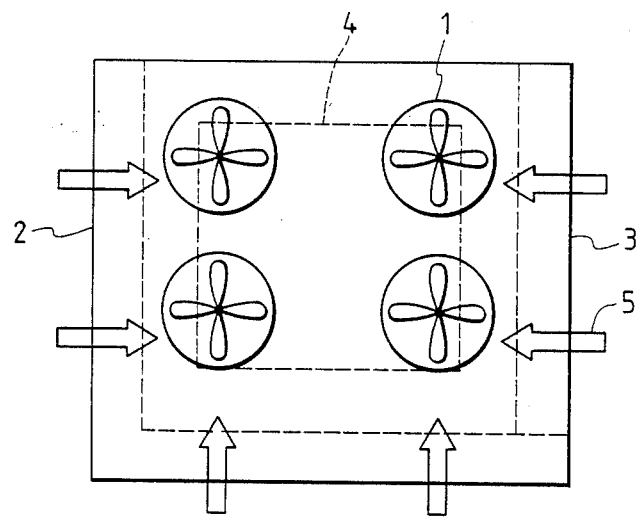
FIG. 1 is a plan view showing a double effect air-cooled absorption refrigerating machine according to one embodiment of the present invention.
Figure 2:
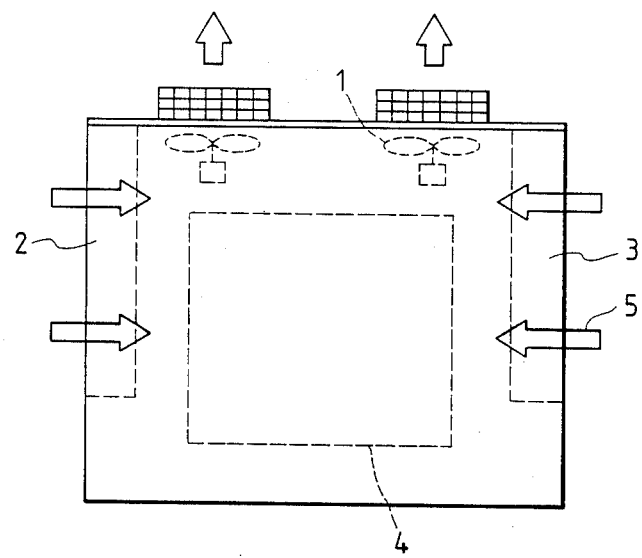
FIG. 2 is a front view of the embodiment shown in FIG. 1.

A plurality of fans 1 (four fans are illustrated in FIG. 1) are disposed on an upper wall face of the faces comprising an upper wall face, a lower wall face and side wall faces which constitute an outside frame of a main body. An air-cooled absorber 2 is disposed on two adjacent wall faces of the side wall faces. An air-cooled condenser 3 is disposed on one wall face of remaining side wall faces.

Other main components designated by the dotted line and identified with the numeral apparatuses 4 are disposed on a central portion of the main body so as to be surrounded by the air-cooled absorber 2 and the air-cooled condenser 3. These main components 4 comprise a high-temperature regenerator 11, a low-temperature regenerator 12, an evaporator 14, a solution pump 19, a refrigerant pump 20 and piping systems for connecting these components operatively.

Figure 3:
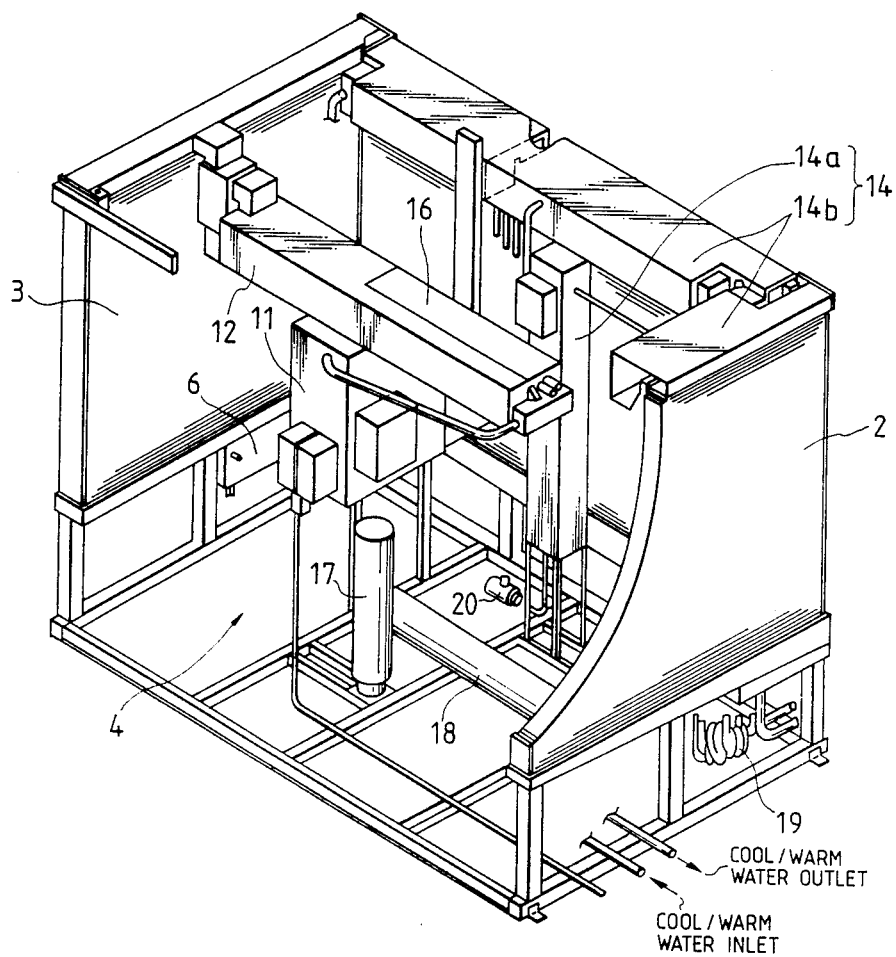
FIG. 3 is a more detailed structural view showing one embodiment of the double effect air-cooled absorption refrigerating machine in which a part thereof is cutoff.

The function of each component will be explained with regard to the embodiment of FIG. 4 described later, and an explanation about the function of each component of this embodiment is omitted. The embodiment of FIG. 3 has a structure is which the evaporator 14 is divided to a refrigerant tank 14a and an evaporation portion 14b, and these parts are connected with piping. The refrigerant is circulated by the refrigerant pump 20. An arrow 5 indicates a flow direction of a cooling air.

A control apparatus 6 controls a number of the driven fans 1 according to an outside air temperature. However this control apparatus may control the rotation or the non-rotation of the fan or control the rotation speed of the fan. It is possible to increase or decrease the disposition number of the fans 1 disposed in accordance with a capacity of the refrigerating machine.

Figure 4:
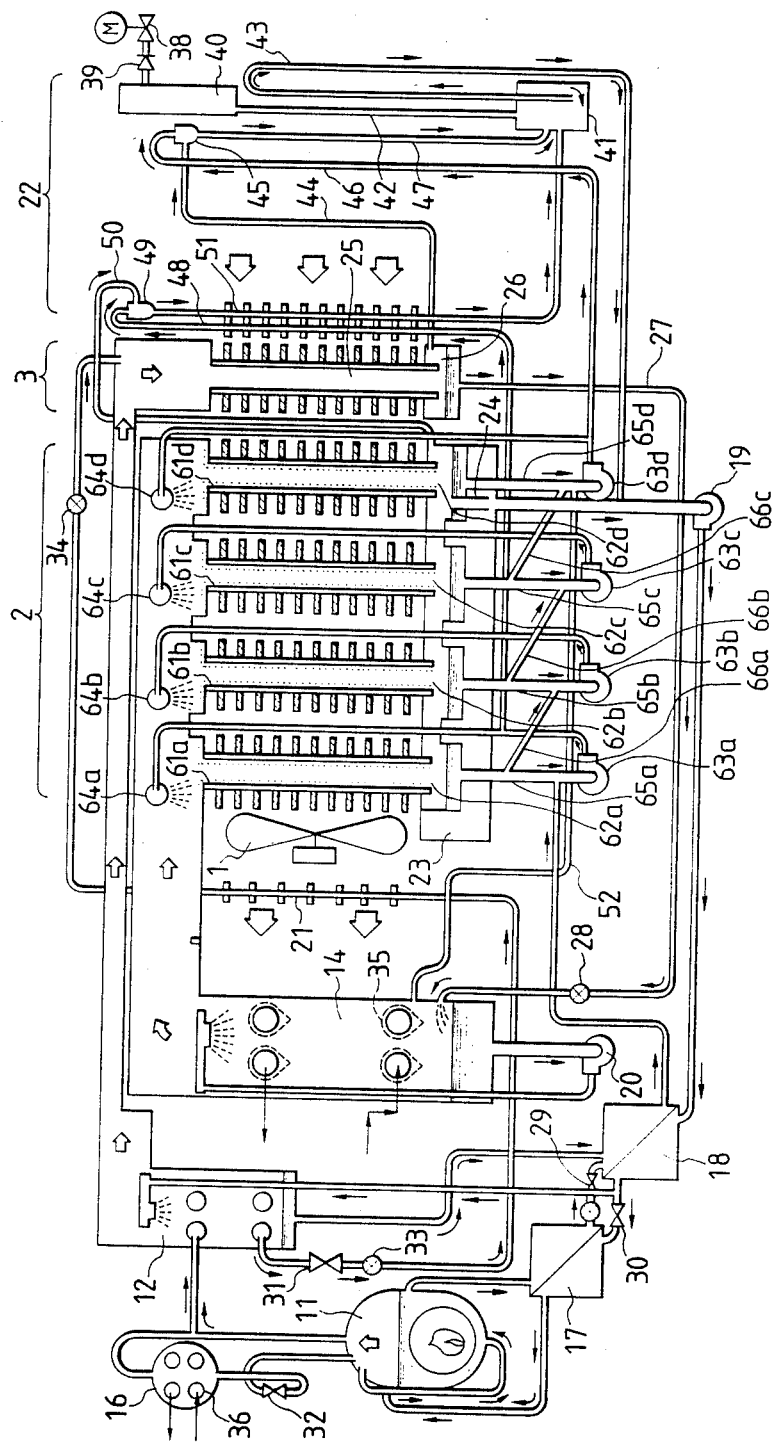
FIG. 4 shows another embodiment of the double effect air-cooled absorption refrigerating machine.

FIG. 4 is a system diagram showing another embodiment of the present invention, in which a double effect air-cooled absorption refrigerating machine comprises a high-temperature regenerator 11, a low-temperature regenerator 12, the air-cooled condenser 3, an evaporator 14, the air-cooled absorber 2, a hot water heat exchanger 16, a high-temperature heat exchanger 17, a low-temperature heat exchanger 18, a solution pump 19, a refrigerant pump 20, a precooler 21, an automatic bleeder 22, pipes for connecting these components together operatively, and fans 1 for supplying the cooling air to the air-cooled condenser 3 and air-cooled absorber 2 in the direction of a white arrow.

The air-cooled absorber 2 comprises a plurality of vertical tubes having horizontally extending fins on the outer surfaces thereof, which vertical tubes (four tubes in the illustrated embodiment) are arranged in parallel with one another in the direction of the flow of the cooling air to form a plurality of path sections.

In particular, the air-cooled absorber 2 is provided with a fourth path vertical tube 61d comprising a plurality of path sections, a third path vertical tube 61c, a second path vertical tube 61b and a first path vertical tube 61a. At a lower portion of these vertical tubes 61 (which is a general reference numeral for the vertical tubes 61a–61d), a first path lower header 62a, a second path lower header 62b, a third path lower header 62c and a fourth path lower header 62d are provided.

A first spray pump 63a, a second spray pump 63b, a third spray pump 63c and a fourth spray pump 63d are connected to these lower headers 62 (which is a general reference numeral for the lower headers 62a–62d), and a first spray means 64a, a second spray means 64b, a third spray means 64d and a fourth spray means 64c, which are used to distribute an absorption liquid, are provided above the vertical tubes 61a, 61b, 61c and 61d, respectively.

The fourth path lower header 62d and a weak solution tank 23 provided under the lower header 62 are communicated with each other through a gas and liquid mixture down-commer pipe 24, and a suction port of the solution pump 19 is provided opposite the lower end of the gas and liquid mixture down-commer pipe 24.

Owing to the gas-liquid mixing effect obtained when the solution flows down, the non-condensible gas in the vicinity of the fourth lower header 62d is extracted, and the weak solution after the extraction is discharged to the high-temperature regenerator 11 and the low-temperature regenerator 12 which are little influenced by the non-condensible gas.

The solution flows through the path sections in the air-cooled absorber 2 through communicating pipes 66a, 66b and 66c provided among the suction pipes 65a–65d, and the density of the absorption liquid, which absorbs the refrigerant vapor in the first to fourth path sections in order, gradually decreases.

The air-cooled condenser 3 comprises vertical tubes 25 having fins on the outer surfaces thereof. The upper end portions of these vertical tubes 25 are communicated with the low-temperature regenerator 12, and the lower end portions of these vertical tubes 25 with the evaporator 14 through a lower header 26, a liquid refrigerant pipe 27 and a restriction member 28.

When the air-cooled condenser 3 is provided in a position in which the air-cooled condenser 3 is close to the fourth path section 61d side of the air-cooled absorber 2 and opposed to the cooling air inlet side rather than the third path section 61c side, the apparatus can be arranged most compactly. Further, when the air-cooled condenser 3 is thus provided, the air-cooled condenser 3 and the fourth path section 61d of the air-cooled absorber 2 can be subjected to heat exchange with the lowest-temperature cooling air.

A cooling operation included in the cyclic operations of the above stated a double effect air-cooled absorption refrigerating machine will now be described.

Absorption liquid of lithium bromide heated with a combustion gas, such as a town gas in the high-temperature regenerator 11, generates refrigerant (water) vapor, and is thereby condensed. The resultant absorption liquid reaches the suction portion of the first path spray pump 63a in the air-cooled absorber 2 through the high-temperature heat exchanger 17, a cooling-warming change-over valve 29 and the low-temperature heat exchanger 18.

In the low-temperature regenerator 12, the refrigerant vapor generated in the high-temperature regenerator 11 is introduced into the pipes joined thereto, and the absorption liquid is sprayed to the outer side of the pipes. The absorption liquid is subjected to heat exchange and generates refrigerant vapor. The absorption liquid is thus condensed and returns to the air-cooled absorber 2 through the low-temperature heat exchanger 18 with the dense solution from the high-temperature regenerator 11.

The refrigerant vapor in a heat transfer pipe in the low-temperature regenerator 12 is condensed and liquefied, and the resultant liquid is subjected to heat exchange with the cooling air in a cooling-warming change-over valve 31, a restriction member 33 and the precooler 21 and thereby cooled, the liquid being then introduced into the air-cooled condenser 3 through a restriction member 34.

Further, the refrigerant vapor from the low-temperature regenerator 12 is introduced into the air-cooled condenser 3, cooled with the cooling air, and thereby condensed and liquefied, and the liquid thus produced flows down to the lower header 26. This liquid refrigerant is sent to the evaporator 14 through the refrigerant pipe 27 and the restriction member 28, and sprayed over the heat transfer pipes group 35 in the evaporator 14 by the refrigerant pump 20.

The resultant liquid refrigerant is subjected to heat exchange with the cold water flowing in the heat transfer pipes 35, and it is thereby evaporated and gasified.

During this time, the latent heat of evaporation is taken from the cold water in the heat transfer pipes 35 to exhibit the refrigerating effect.

The refrigerant vapor generating from the evaporator 14 is introduced into the air-cooled absorber 2, and flows from the upper portions of the vertical tubes 61a–61d thereinto to be absorbed by the absorption liquid.

The dense liquid from the high-temperature regenerator 11 and the low-temperature regenerator 12 enters the first path vertical tube 61a first and absorbs the refrigerant vapor, and the density of the solution gradually decreases. Accordingly, the saturation temperature of the absorption liquid with respect to the refrigerant vapor also decreases. As a result, the solution enters the fourth path vertical tube 61d with the temperature and density thereof in the lowest levels.

The temperature of the cooling air increases gradually due to the heat exchange from the fourth path section to the first path section. Such heat exchange can be regarded as four-path orthogonal counter-flow heat exchange, and it enables the saturation temperature of the absorption liquid in the first path section to be set low as compared with the temperature of the cooling air coming out of the fourth path section substantially in the same manner as in a water cooled type cold calorifier.

The low-temperature low-density absorption liquid produced in the air-cooled absorber 2 is divided into two by the solution pump 19 through the low-temperature heat exchanger 18. One divided absorption liquid is sent to the low-temperature regenerator 12, and the other to the high-temperature heat exchanger 17, to complete a refrigerating cycle.

A warming cycle will now be described. The air-conditioning change-over valves 29 and 30 are provided at the solution outlet port and the solution inlet port of the high-temperature regenerator 11. An air-conditioning change-over valve 31 is provided at an intermediate portion of a refrigerant flow passage extending from the high-temperature regenerator 11 to the air-cooled condenser 3 through the interior of the heat transfer pipe in the low-temperature regenerator 12 and the precooler 21. A condensed water discharge valve 32 in the hot water heat exchanger 16 is connected to the high-temperature regenerator 11.

When the air-conditioning change-over valves 29 and 30 are closed with the condensed water discharge valve 32 opened, the liquid refrigerant in the hot water heat exchanger 16 is discharged into the high-temperature regenerator 11 to enable the refrigerant vapor generated from the high-temperature regenerator 11 to flow into the hot water heat exchanger 16.

Accordingly, the hot water flowing in the heat transfer pipe 36 in the hot water heat exchanger 16 can be heated. During this time, the density of the solution in the high-temperature regenerator 11 decreases due to the liquid refrigerant supplied thereto, and, even when the hot water of a high temperature (60° C.) is taken out, the boiling point can be kept lower than that in the cooling operation. This enables the boiler efficiency to be improved.

The construction and operation of the automatic bleeder 22 will now be described. The automatic bleeder 22 is a bleeder utilizing the gas-carrying effect due to the movement of a liquid and provided with a gas storage tank 40 connected to a gas discharge means (not shown) through an electro-magnetic valve 38 and a check valve 39, a gas-liquid separator 41 provided below the gas storage tank 40, a gas up-commer pipe 42 connecting the gas storage tank 40 and the gas-liquid separator 41 together, and an inverted U-shaped seal pipe 43 extending from the bottom portion of the gas-liquid separator 41, the absorption liquid returns to the suction pipe of the solution pump 19 through the inverted U-shaped seal pipe 43.

A bleeder pipe 44 connected to the lower header 26 of the air-cooled condenser 3 is joined to a gas mixing chamber 45. With the absorption of the refrigerant vapor into a weak solution flowing down through a weak solution pipe 46, the air-cooled condenser 3 is subjected to bleeding, and the extracted non-condensible gas flows down in a gas-liquid mixed state in a gas-liquid down-commer pipe 47 to be sent to the gas-liquid separator 41, in which the gas is separated. The separated gas flows up to the gas storage tank 40, and to the solution pump 19 through the inverted U-shaped seal portion 43.

Owing to the pressure maintaining effect of the inverted U-shaped seal pipe 43 and the reverse air lift pumping effect of the gas-liquid down-commer pipe 47, a gas can be stored in the gas storage tank 40 at a pressure higher than the internal pressures of the air-cooled absorber 2 and the air-cooled condenser 3. Therefore, an aspirator or a low-vacuum discharge pump serves sufficiently as the above-mentioned air discharge means.

In this embodiment, two bleeders are used for the bleeder of the air-cooled absorber 2. A first bleeding comprises the gas-liquid down-commer pipe 24, by which a gas is simply discharged to the high-pressure side, and it has a large effect for preventing the over-condensation of the absorption liquid.

A second bleeder means comprises the reverse air lift pump mentioned above. A comparatively dense solution is introduced from the first spray pump 63a to the gas mixing chamber 49, which is provided in a position higher (suitably by about 250 mm) than the gas mixing chamber 45 for the extracted gas from the air-cooled condenser 3, through the precooler 48 provided with fins on the outer surface thereof.

The comparatively dense solution absorbs the refrigerant vapor introduced from a bleeder pipe 50 connected to the fourth path lower header 62d in the air-cooled absorber 2, the non-condensible gas carried by this refrigerant vapor being subjected to mixing in a gas-liquid down-commer pipe 51 and sent to the separator 41. The gas-liquid down-commer pipe 51 is also provided with fins and cooled with the cooling air.

Since the precooler 48 and gas-liquid down-commer pipe 51 are cooled with the air on the side of the cooling air inlet, the saturation vapor pressure of the solution is lower than the pressure in the lower header 62 in the air-cooled absorber 3.

When the liquid refrigerant is over-condensed and stagnates in excessive quantities in the evaporator 14, it flows into the suction pipe joined to the fourth spray pump 63d through an overflow pipe 52, and the fourth path circulated solution is diluted. The density of the weak solution sent from the solution pump 19 decreases rapidly without accompanying a rapid decreases in the temperature thereof, so that the crystallization of the dense solution in the low-temperature heat exchanger 18 can be prevented.

Since the liquid in the pipe forms a liquid-sealed state in which the flow of vapor is stopped by the liquid, i.e., since a so-called liquid seal is formed, the entry of vapor does not occur, and, therefore, the bleeding of the lower header 62 is not restrained. Accordingly, even when the over-condensation occurs due to the existence of, especially, a non-condensible gas, the self-returning capability can be displayed.

A double effect air-cooled absorption refrigerating machine generally requires a large air cooling heat transfer area and a large fan installation area. However, according to this embodiment, a space saving factor becomes highest and a radiation amount can be increased with a minimum installation area.

Further, since the fans 1 are provided at the upper wall face, noise from the fans 1, which is the largest noise generating source, does not spread to the side portion of the refrigerating machine and does spread toward the upper portion thereof. This enables the noise level to be lowered.

Further, one wall face of the side wall faces and provides an access for detecting the inner portion of the refrigerating machine. It is preferred in a non-aeration structure to make this wall face so as to obtain the bleeding amount.

We claim:

1. A double effect air-cooled absorption refrigerating machine utilizing a vacuum pressure as an operational pressure and having components comprising at least an evaporator, a vertical pipe type air-cooled absorber, a vertical pipe-type air-cooled condenser, a high-temperature regenerator, a low-temperature regenerator, a solution heat exchanger, pipings for connecting operatively these components and a plurality of fans for supplying cooling air to said air-cooled condenser, wherein
said plurality of fans are disposed on an upper wall face which, together with a lower wall face and side wall faces, constitute a hexahedron shaped outside frame of a machine body, said air-cooled absorber having an air-cooled heat exchanger which is disposed on two adjacent side wall faces, said air-cooled condenser having an air-cooled heat exchanger which is disposed on one side wall face of remaining side wall faces, and said evaporator, said high-temperature regenerator, said low-temperature regenerator, said solution heat exchanger and said pipings for connecting operatively these components are disposed respectively on an inner portion of the machine body so as to be surrounded by said air-cooled absorber and said air-cooled condenser.

2. A double effect air-cooled absorption refrigerating machine according to claim 1, wherein said fans are disposed so as to suck the cooling air through said heat exchanger of said air-cooled absorber and said air-cooled condenser and exhaust from the upper wall face of the machine body to the outside.

3. A double effect air-cooled absorption refrigerating machine utilizing a vacuum pressure as an operational pressure and having components comprising at least an evaporator, a vertical pipe-type air-cooled absorber, a vertical pipe-type air-cooled condenser, a high-temperature regenerator, a low-temperature regenerator, a solution heat exchanger, pipings for connecting operatively these components and a plurality of fans for supplying cooling air to said air-cooled condenser wherein
said plurality of fans are disposed on an upper wall face which, together with a lower wall face and side wall faces, constitute a hexahedron shaped outside frame of a machine body, said air-cooled absorber having an air-cooled heat exchanger which is disposed on two adjacent side wall faces, said air-cooled condenser having an air-cooled heat exchanger which is disposed on one side wall face of remaining two side wall faces, and further another side wall face of remaining side wall faces if formed as a side wall face for allowing detection of an inner portion of the machine body, and said evaporator, said high-temperature regenerator, said low-temperature regenerator, said solution heat exchanger and said pipings for connecting operatively these components are disposed respectively on an inner portion of the machine body so as to be surrounded by said air-cooled absorber and said air-cooled condenser.

4. A double effect air-cooled absorption refrigerating machine according to claim 3, wherein said wall face allowing detection of the inner portion of the machine body is a nonaeration structure.

5. A double effect air-cooled absorption refrigerating machine utilizing a vacuum pressure as an operational pressure and having components comprising at least an evaporator, a vertical pipe-type air-cooled absorber, a vertical pipe-type air-cooled condenser, a high-temperature regenerator, a low-temperature regenerator, a solution heat exchanger, pipings for connecting operatively these components and a plurality of fans for supplying cooling air to said air-cooled condenser, wherein
said plurality of fans are disposed on an upper wall face which, together with a lower wall face and side wall faces, constitute a hexahedron shaped outside frame of a machine body, said evaporator, said high-temperature regenerator, said low-temperature regenerator, said solution heat exchanger and said pipings for connecting operatively these components are disposed respectively on an inner portion of the machine body so as to be surrounded by said air-cooled absorber and said air-cooled condenser, said low-temperature regenerator is disposed at an upper portion of said high-temperature regenerator, and said solution heat exchanger is disposed at a lower portion of said high-temperature regenerator.

6. A double effect air-cooled absorption refrigerating machine utilizing a vacuum pressure as an operational pressure and having components comprising at least an evaporator, a vertical pipe-type air-cooled absorber, a vertical pipe-type air-cooled condenser, a high-temperature regenerator, a low-temperature regenerator, a solution heat exchanger, pipings for connecting operatively these components and a plurality of fans for supplying cooling air to said air-cooled condenser, wherein
said plurality of fans are disposed on an upper wall face which, together with a lower wall face and side wall faces, constitute a hexahedron shaped outside frame of a machine body, said air-cooled absorber having an air-cooled heat exchanger is disposed on two adjacent side wall faces, said air-cooled condenser having an air-cooled heat exchanger which is disposed on one side wall face of remaining side wall faces, said evaporator, said high-temperature regenerator, said low-temperature regenerator, said solution heat exchanger and said pipings for connecting operatively these components are disposed respectively on an inner portion of the machine body so as to be surrounded by said air-cooled absorber and said air-cooled condenser, and a control apparatus for controlling a drive of said plurality of fans is provided in the machine body.

7. A double effect air-cooled absorption refrigerating machine according to claim 6, wherein said control apparatus controls the number of said plurality of fans driven in accordance with an outside air temperature.

8. A double effect air-cooled absorption refrigerating machine according to claim 6, wherein said control apparatus controls a rotation speed of said plurality of fans in accordance with an outside air temperature.

9. A double effect air-cooled absorption refrigerating machine utilizing a vacuum pressure as an operational pressure and having components comprising at least an evaporator, a vertical pipe-type air-cooled absorber, a vertical pipe-type air-cooled condenser, a high-temperature regenerator, a low-temperature regenerator, a solution heat exchanger, pipings for connecting operatively these components and a plurality of fans for supplying cooling air to said air-cooled condenser, wherein said plurality of fans are disposed on an upper wall face which, together with a lower wall face and side wall faces, constitute a hexahedron shaped outside frame of a machine body, said air-cooled absorber having an air-cooled heat exchanger which is disposed on two adjacent side wall faces, said air-cooled condenser having an air-cooled heat exchanger which is disposed on one side wall face of remaining side wall faces, said evaporator, said high-temperature regenerator, said low-temperature regenerator, said solution heat exchanger and said pipings for connecting operatively these components are disposed respectively on an inner portion of the machine body so as to be surrounded by said air-cooled absorber and said air-cooled condenser, and means for driving said plurality of fans is operatively associated with said plurality of fans so as to suck the cooling air from said air-cooled absorber and said air-cooled condenser.

* * * * *